May 12, 1964 W. SMITH 3,132,644
APPARATUS FOR SPINAL DIAGNOSTIC ANALYSIS
Filed Jan. 3, 1963
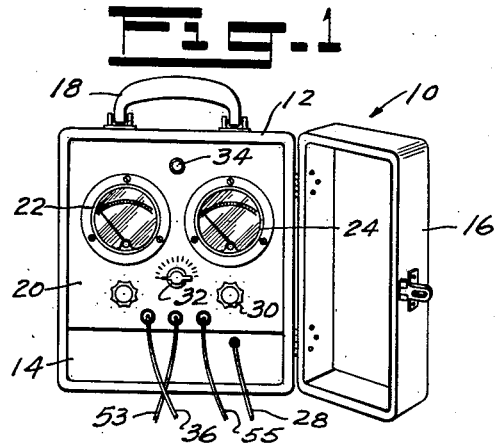
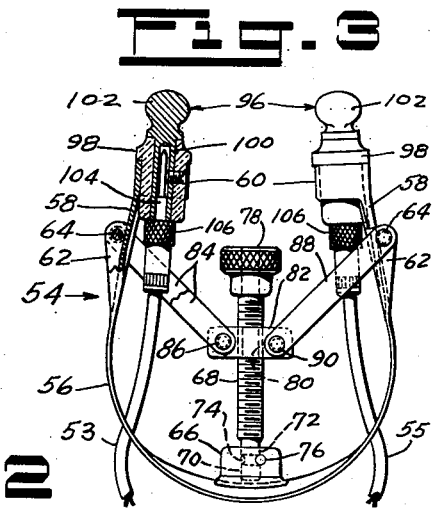
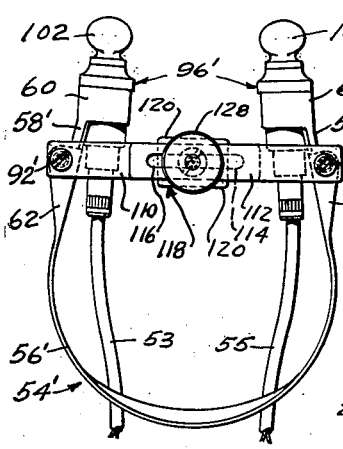
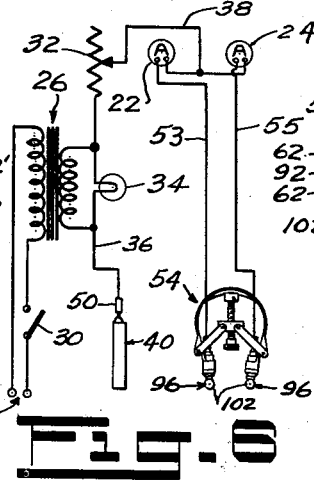
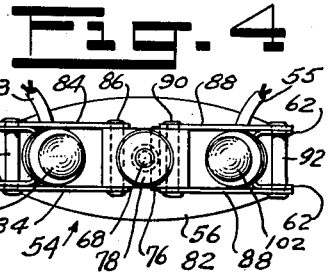
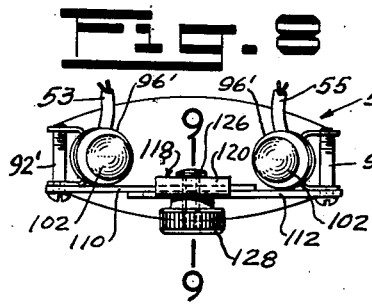
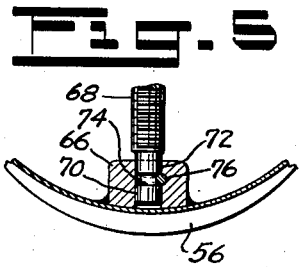
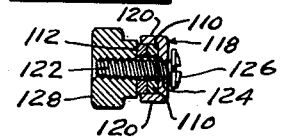
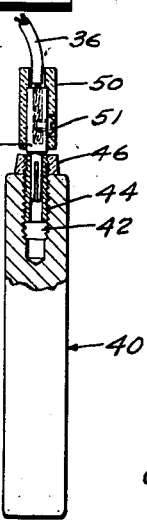
INVENTOR.
WILLIAM SMITH
BY
Edw. S. Higgins
ATTORNEY

United States Patent Office 3,132,644
Patented May 12, 1964

3,132,644
APPARATUS FOR SPINAL DIAGNOSTIC
ANALYSIS
William Smith, 53 S. Broadway, Yonkers, N.Y.
Filed Jan. 3, 1963, Ser. No. 249,284
1 Claim. (Cl. 128—2.1)

This invention relates to apparatus for measuring the changes in resistance of the nerve tissues of the human spine to a current of electricity and more particularly to new and useful improvements in an applicator for use with such apparatus, and this invention is an improvement over my Patent No. 2,008,295.

It is well known that the nerves govern or control the resistance of the tissues of the human body, and it is also accepted that healthy nerve tissues offer greater resistance to the electric current than unhealthy nerve tissues.

It is also well known that the roots of the spinal nerves, from their origin in the cord, run obliquely to the point of exit from the invertebral foramen. The amount of the obliquity in different regions of the spine varies, being greater in the lower than in the upper part. Normal healthy nerve tissues right and left of the intervertebral foramen offer the same resistance to electrical current. A subluxated or displaced vertebra will alter the resistance, right or left, of the intervertebral foramen.

An important object of the present invention is to locate abnormal conditions in the human spine.

Another important object of the invention is to provide an apparatus embodying a plurality of electrodes adapted to contact the spine with means for measuring the changes in resistance offered by the nerve tissues of the spine to a flow of electric current whereby the observer may locate local differences in such resistance.

In carrying out the invention, I take into consideration the fact that the human body particularly the spine is a conductor of electricity and that healthy nerve tissues offer a resistance to a flow of electric current different from that of unhealthy nerve tissues.

I provide a portable apparatus for passing a voltage of electricity through the spine and comparing the current as it comes out of the spine on opposite sides of the spine to determine what changes in resistance is offered by the nerve tissues at said sides.

Another object of the invention is to provide an improved applicator for use with such apparatus that is adapted to be adjusted so as to measure the changes in resistance of nerve tissues of spines of various widths.

Still another object is to provide an applicator for such apparatus that is simple and rugged in construction, that is highly efficient for the purposes intended and that can be manufactured and sold at a reasonable cost.

For further comprehension of the invention and of the objects and advantages thereof, reference will be had to the following description and accompanying drawings taken in connection with the drawings wherein:

FIG. 1 is a front elevational view of the apparatus with which the improved applicator is to be used, the door of the casing being shown in open position.

FIG. 2 is a diagram of the wiring arrangement used with the apparatus.

FIG. 3 is a side elevational view of the preferred form of the improved applicator used with the apparatus.

FIG. 4 is a top plan view thereof.

FIG. 5 is an enlarged sectional detail view through the juncture of the screw and block.

FIG. 6 is a side elevational view of the hand contact member used with the applicator, parts being shown in section and parts being shown broken away.

FIG. 7 is a view similar to FIG. 3 showing a modified form of applicator used with the apparatus.

FIG. 8 is a top plan view thereof.

FIG. 9 is a vertical sectional view taken along the line 9—9 of FIG. 8.

Referring in detail to the drawing, the apparatus for measuring the resistance of the tissues and nerves of the human spine to a current of electricity is indicated generally at 10 and is adapted to be mounted in a portable rectangular shaped casing 12, with a shallow body 14 and with a hinged cover 16. A handle 18 is provided on the top of the casing, for convenience in carrying the apparatus. The apparatus includes a panel 20 of insulating material fitted in the casing. A microampmeter or milliammeter 22 is disposed on one side of the casing and a milliammeter 24 on the other side, both of said milliammeters being of ordinary construction and capable of measuring electric current and being mounted on the front of the panel.

The milliammeter 22 is connected to one side of the secondary winding of a step-down transformer 26, the primary winding of which is connected to a source of electric supply indicated at 28, such as the house supply of 110 volts.

A switch 30 is placed in the main or house supply line to control the same, and a rheostat 32 is placed in the secondary supply line to control the voltage. A pilot lamp 34 is placed in the secondary circuit to indicate that the apparatus is properly functioning and to prevent surging.

Connected to the opposite side of the secondary winding of the transformer 26 in a flexible conductor 36 and connected to the other side is a conductor or line 38 to which the variable resistance or rheostat 32 is connected. This conductor 38 leads to the milliammeters 22 and 24. Removably attached to the conductor 36 is a metal hand piece 40. The hand piece comprises an elongated round metal body with a central socket 42 at one end and the connection with conductor 36 includes a threaded metal bushing 44 in the socket 42 and projecting outwardly thereof. An insulating washer 46 is threaded around the protruding end of the sleeve. A slitted metal terminal 48 is connected to the end of the conductor 36 and around the connection there is an insulating sleeve 50. The terminal 48 is adapted to be yieldingly fitted into the bushing 44. Set screw 51 presses wire 36 against the terminal. Leading from the milliammeter 22 is a conductor 53 and leading from milliammeter 24 is a conductor 55.

In accordance with the present invention, a novel portable applicator indicated generally at 54 in FIG. 3 is attached to the conductors 53 and 55. The applicator 54 comprises an arcuate-shaped plate-like spring metal body 56, semi-circular in configuration. At its center, the body is slightly concavo-convexo in cross-section, and at its ends the body is formed with extensions 58 slightly arcuate-shaped in cross-section that terminate in split collars or rings 60. Integral triangular shaped lugs 62, 62 are formed on the body at its juncture with each of the extensions 58, the lugs radiating outwardly. A hole 64 is formed in the outer end of the base of each lug 62. A solid metal block 66 is soldered to the top convexed surface at the center of the body. A screw threaded stem 68 is supported in upright position in a socket 70 formed in the center of the block. The end 72 of the stem engaged in the block is smooth and formed with an annular groove 74. A pin 76 extends across the block and extends through the groove at one side of the stem to prevent withdrawal or longitudinal movement of the stem but permit rotation thereof. A knurled nut 78 is fastened to the other top end of the stem for turning the same. Stem 68 extends through a central threaded opening 80 in a metal nut or block 82. A pair of metal links 84 is pivotally connected by pivot pin 86 to one end of the block 82, and a similar pair of metal links 88 is connected at one end by pivot pin 90 to the other end of the block. The other ends of the links are pivotally connected by pins 92 to the lugs 62 on the ends of the body. By reason of this construction, when the stem 68 is turned by means of the nut 78 in one direction, for example, counterclockwise as viewed in FIG. 4, the ends of the body and extensions 58 are drawn toward each other, and when turned in the opposite direction the ends and extensions are moved away from each other. A very fine adjustment of the length of the space between the ends of the body is thus provided. The semi-circular body 56 serves as a convenient handle for manipulation of the applicator.

A metal contact assembly 96 is detachably supported in the split ring or collar 60 of each body extension 58. Each contact assembly consists of an insulating sleeve 98 in which is fitted a tubular metal contact member 100 with a spherical head 102 seated on the outer end of sleeve 98. A metal plug 104 is fitted in the tubular contact member 100, the plug having a knurled outer surface 106 for turning the same. One of the plugs 104 is connected to the bare end of conductor 53 and the other plug 104 is connected to the bare end of conductor 55.

Both sides of the spinal column touched by the contact assemblies 96 being constructed substantially alike and being covered by the same construction and arrangement of fleshy tissues, the resistance to the flow of current passing through each side should be the same and therefore the resistance recorded on milliammeters 22 and 24 should be the same. If, however, either of the sides of the spinal column touched, is diseased or inflamed or injured or the tissue structure is abnormal for one reason or another, such diseased spot or area will offer a lesser resistance to the flow of electricity therethrough, and such lesser resistance will be recorded on the particular milliammeter connected to the circuit in which said spot or area is located. For instance, if the left side of the spinal column is diseased at the area touched, the lesser resistance offered thereby will be indicated on milliammeter 22; and if the right side is diseased milliammeter 24 will record it.

By reason of this method, a positive way of detecting areas of the spinal column and thus localizing trouble is afforded. This detection is accomplished instantly by a mere glance at the milliammeters and requires no skill or complicated technique.

The operation of the apparatus is as follows: the switch 30 is closed and the rheostat 26 adjusted to regulate the flow of current desired. The patient is given the hand piece 40 to hold in his hand. The operator then takes the applicator device 56 and with the contact assemblies 96 simultaneously touches with a uniform pressure both sides of the spinal column of the patient. Immediately upon touching the spinal column with the contact assemblies, two circuits are completed as follows: main line 28, transformer 32, conductor 36, hand piece 40, the body of the patient, contact 100, plug 104, conductor 53, milliammeter 22, conductor 38 to transformer, comprising the circuit through milliammeter 22; also main line 28, transformer 32, conductor 36, hand piece 40, body of patient, contact 100, conductor 55, milliammeter 24, conductor 38 to transformer, comprising the circuit through milliammeter 24.

In FIGS. 7 to 9, inclusive, there is illustrated a modified form of applicator 54'. This form differs from the applicator 54 in the mechanism for moving the ends and extensions 58' of the body toward and away from each other. In this form, for this purpose, a pair of elongated plates 110 and 112 are connected to one end of the pins 92' on the ends of the body 54' at one side thereof. The inner ends of the plates are in slidable overlapped relation and formed with closed central slots 114 and 116, respectively. The slotted overlapped ends are adapted to be slid toward and away from each other manually so as to adjust the space between the contact assemblies 96'. Means is also provided for clamping the slidable plates in moved adjusted position. For this purpose, a flanged plate 118 is slidably mounted on plate 114 over its slotted end, the flanges 120 of the plate encompassing the long edges of plate 116. A threaded stem 122 extends loosely through the slots in the plates 110 and 112 and through a threaded opening 124 in the flanged plate 118 at which end it is provided with a slotted head 126. A knob 128 is formed on the other end of the stem for turning the same.

In using this form of applicator 54', in order to adjust the distance between the ends of the body 56' the flanged plate 118 is loosened and the plates 110 and 112 moved away or toward each other as desired. When so moved, the knob 128 of stem 122 is turned thereby clamping the flanged plate against the slotted ends of the plates 110 and 112 thereby holding the plates in moved adjusted position. This adjustment is needed as the width of the spines vary due to age and deformities caused by injuries and sickness.

In all other respects, the applicator 54' is similar to applicator 54 and similar reference numerals are used to indicate similar parts throughout.

While I have illustrated and described the preferred embodiments of my invention, it will be understood that changes in details might be made without departing from the principle of the invention and I desire to be limited therefore only by the state of the prior art and the appended claim.

I claim:

In apparatus for locating abnormal conditions along the spinal column, an applicator comprising a semi-circular shaped spring metal plate-like body having semi-circular ringlike members at the ends thereof for supporting contact assemblies for measuring the changes in resistance of the nerve tissues of the human spinal column to a current of electricity, a block on the top surface of the body at its center, said block having a central socket, a threaded stem extending upright from the socket in said block, said stem having a bottom smooth portion in said socket, means presenting withdrawal of said stem yet permitting rotation thereof in the socket, said means including a pin extending through said block and along a groove in the smooth portion of the stem, a threaded block movable along the threaded stem, linkage actuated by turning of the stem for drawing the ringlike members of the body toward and away from each other to adjust the dimension of the space between the ringlike members, a nut on the stem for turning the same and a contact assembly carried by each ringlike member, said assembly including a tubular contact member with a spherical head.

References Cited in the file of this patent
UNITED STATES PATENTS

| | | |
|---|---|---|
| 1,648,942 | Hayman | Nov. 15, 1927 |
| 2,008,295 | Smith | July 16, 1935 |
| 2,570,414 | Wapner | Oct. 9, 1951 |